United States Patent
Daggett

(10) Patent No.: US 6,698,687 B2
(45) Date of Patent: Mar. 2, 2004

(54) AIRCRAFT WING HEAT EXCHANGER APPARATUS AND METHOD

(75) Inventor: David L. Daggett, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/075,063

(22) Filed: Feb. 13, 2002

(65) Prior Publication Data

US 2003/0150955 A1 Aug. 14, 2003

(51) Int. Cl.[7] .............................................. B64D 33/10
(52) U.S. Cl. ....................................................... 244/57
(58) Field of Search ........................ 244/134 R, 134 B, 244/134 C, 134 E, 57

(56) References Cited

U.S. PATENT DOCUMENTS

| | | |
|---|---|---|
| 5,558,303 A | 9/1996 | Koethe et al. |
| 5,947,418 A | 9/1999 | Bessiere et al. |
| 6,338,455 B1 | 1/2002 | Rauch et al. |
| 2003/0150955 A1 * | 8/2003 | Daggett ........................ 244/57 |

* cited by examiner

*Primary Examiner*—Charles T. Jordan
*Assistant Examiner*—Stephen Holzen
(74) *Attorney, Agent, or Firm*—Harness, Dickey & Pierce P.L.C.

(57) ABSTRACT

A heat exchanger system and method for heating selected areas of the wings of an aircraft. The heat exchanger apparatus involves the use of a heat exchanger and thermal contact with the fluid of a gear box associated with a geared fan powerplant used on an aircraft. The heat exchanger is in fluid communication with at least one, and more preferably a plurality, of conduits which circulate fluid heated by the fluid of the gearbox throughout the selected areas of the wings of the aircraft. This serves to selectively heat various areas of the wings to help prevent icing of the leading edge of each of the wings, as well as to increase the region of laminar flow over the wings, and thus decrease those areas where turbulent flow occurs.

14 Claims, 1 Drawing Sheet

AIRCRAFT WING HEAT EXCHANGER APPARATUS AND METHOD

FIELD OF THE INVENTION

This invention relates to systems for preventing icing of the wings of an aircraft and extending the area of laminar flow of air over the wings of an aircraft, and more particularly, to a heat exchanger apparatus and method for heating selected areas of the wings of an aircraft via a heated fluid to thereby prevent icing of the wings, improve laminar flow of air over the wings, reduce thermal management system weight, and reduce aircraft drag by eliminating air cooled heat exchangers.

BACKGROUND OF THE INVENTION

Heat rejection loads are expected to increase for future gas turbine engines used with various forms of mobile platforms, such as aircraft. For advanced technology geared power plants such as, for example, the Pratt-Whitney 8000 series of jet engine, there is a substantial weight and drag penalty associated with the cooling of the gear box fluid using the presently implemented air-cooled heat exchanger.

Heat rejection loads will also increase as more and more power electronics are used on aircraft. For aircraft that may dispose of engine bleed air requirements, the pneumatic systems that were previously driven by bleed air will be replaced with high power electrically driven systems, necessitating improved heat rejection methods.

With present day aircraft wing anti-ice systems, hot engine bleed air is utilized to heat the leading edge of each of the wings of the aircraft. This arrangement, however, consumes engine power and increases specific fuel consumption. Present day aircraft also use heat rejection from aircraft avionics to heat the cargo hold area of an aircraft. This scheme is also inefficient.

Another factor that is important with present day aircraft is increasing the area of laminar flow over the wings. It is known that as air flows over the upper surface of a wing it becomes increasingly turbulent. Eventually, the air transitions from a laminar to a turbulent condition. Turbulent flow results in increases to parasitic drag. If the leading edge of a wing is heated and the downstream surface is cold, the transition to turbulent flow can be delayed.

Various methods have been proposed to increase the laminar flow region on the wing. One such method involves blowing hot air over the surface. Another method involves sucking the boundary layer down through small surface holes in the wings. Still another method involves injecting small pulsing airflows through the use of thousands of piezoelectric transducers and the use of various surface treatments on the wings. However, these methods often require dedicated energy sources that often offset the gains achieved by increasing the system complexity, adding cost and increasing the required engine power extraction. Additional difficulties may be encountered through airborne contaminates such as bugs and other debris that might potentially clog the system and also lead to tripping of the boundary layer.

It is therefore a principal object of the present invention to eliminate the weight and drag penalties presently associated with air-cooled heat exchangers used in connection with advanced, technology geared fan power plants and more electric aircraft architectures. It is also an important object of the present invention to eliminate the use of hot engine bleed air to heat the leading edges of the wings of aircraft. Still further, it is an object of the present invention to better use the rejected heat from the airframe of the aircraft in heating the leading edges of the wings.

Still further, it is an object of the present invention to extend the wing upper surface laminar flow region on each of the wings of an aircraft to thereby delay the transition from laminar to turbulent flow.

SUMMARY OF THE INVENTION

The above noted objects are provided by an aircraft wing heat exchanger apparatus and method in accordance with a preferred embodiment of the present invention. The heat exchanger apparatus of the present invention incorporates a heat exchanger in thermal contact with a heat generating component of the aircraft, such as with the gear box oil in the engine of the aircraft. The heat exchanger is coupled to at least one conduit which extends within the interior of a portion of the aircraft, such as the wing, to form a complete circuit through which fluid may flow from the heat exchanger, through the conduit and back into the heat exchanger. The conduit is made from a thermally conductive material and is in thermal contact with an outer skin of the aircraft, such as a leading edge of a wing of the aircraft. In an alternative preferred embodiment, a second conduit is coupled to the heat exchanger for circulating fluid through to selectively heat portions of the wings of the aircraft to increase the boundary for laminar flow of air over the wings. In another preferred embodiment a third conduit is routed into the fuselage and coupled to the heat exchanger for drawing heat from a heat source, such as aircraft avionics, disposed within the fuselage of the aircraft.

Each conduit includes a supply portion and a return portion which helps to form the complete circuit for fluid flow to and from the heat exchanger. The conduits may be formed from a wide variety of materials and in various shapes and profiles, but in one preferred form are manufactured from an aluminum alloy and disposed within the aircraft wing so as to be in thermal contact with an outer skin at the leading edge of the wing. The heated fluid helps to prevent icing of the leading edges of the wings during cold weather conditions. Heating of the leading edge of a wing also helps to extend the boundary for laminar flow over the wing to thus reduce the area over the wing during which turbulent flow occurs.

The heat exchanger apparatus of the present invention avoids the weight and drag penalties associated with present day air-cooled heat exchangers used to cool the gear box of high technology geared fan powerplants. The heating apparatus further does not add any significant weight to an aircraft or significantly complicate the construction or maintenance of an aircraft. The heating of selected surfaces of the wings of an aircraft reduces parasitic drag by increasing the area of laminar flow and decreasing the point at which turbulent flow begins.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
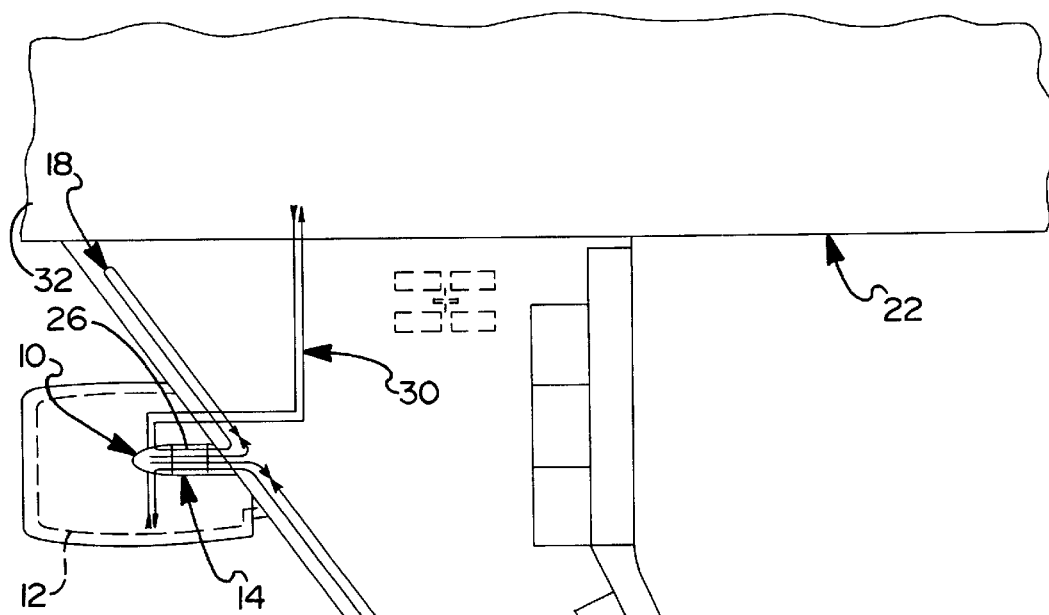
FIG. 1 is a plan view of a portion of a fuselage of an aircraft together with one wing of the aircraft illustrating the heat exchanger apparatus of the present invention in simplified form.

Referring to FIG. 1, there is shown a heat exchanger apparatus 10 in accordance with a preferred embodiment of the present invention. The heat exchanger apparatus 10 is adapted for use with a geared fan powerplant (i.e., jet engine) 12 such as, for example, a Pratt Whitney PW8000 series jet aircraft engine. It will be appreciated, however, that the present invention may be used with a variety of geared fan powerplants and is therefore not limited to one specific form of powerplant.

The heat exchanger apparatus 10 includes a primary heat exchanger 14, such as a shell and tube heat exchanger, which is in thermal contact with the fluid used to cool the gear box of the powerplant 12. The apparatus 10 includes at least one thermally conductive conduit 16 which includes a fluid supply portion 16a and a fluid return portions 16b. A fluid is disposed within the primary heat exchanger 14 and the portion 16a and 16b of conduit 16 form a complete circuit for allowing fluid to be circulated from the heat exchanger 14, into supply portion 16a, through return portion 16b and back into the primary heat exchanger 14. A second length of thermally conductive conduit 18 may also be coupled in fluid communication with the primary heat exchanger 14 if it is desired to use more than one length of conduit for heating purposes. A second length of thermally conductive conduit also increases system safety in the event of fluid leakage in another portion of the circuit 16.

The conduits 16 and 18 are disposed within an interior area of a wing 20 of an aircraft 22. The conduits 16 and 18 are preferably disposed closely adjacent a leading edge 24 of the wing 20. The primary heat exchanger 14 further includes a pump 26 which operates to pump fluid from the heat exchanger 14 into the conduits 16 and 18. Since the fluid is in thermal contact with the fluid within the gear box of the powerplant 12, heat is transferred from the gear box oil fluid to the fluid that circulates through the conduits 16 and 18. This further increases safety by avoiding having engine oil circulating throughout the airframe, and instead containing the engine oil within the engine nacelle. Each of the conduits 16 and 18 are further positioned in thermal contact with an outer skin 28 of the wing 20 such that the transfer of heat from the fluid is made to the outer skin 28.

Heating of the leading edge 24 and selected areas of the wing 20 not only serves to prevent icing of the leading edge, but also helps to extend the boundary line between which laminar airflow over the wing turns into a turbulent airflow. Increasing the distance of laminar flow over the wing 20 serves to reduce the parasitic drag that would otherwise be caused by turbulent flow.

With further reference to FIG. 1, one or more third conduits 30 may be used to circulate fluid from the primary heat exchanger 14 to a heat generating component on board a fuselage 32 of the aircraft 22. In this manner, the fluid can be used to remove heat from heat generating components such as avionics and power converter components.

Figure 2:
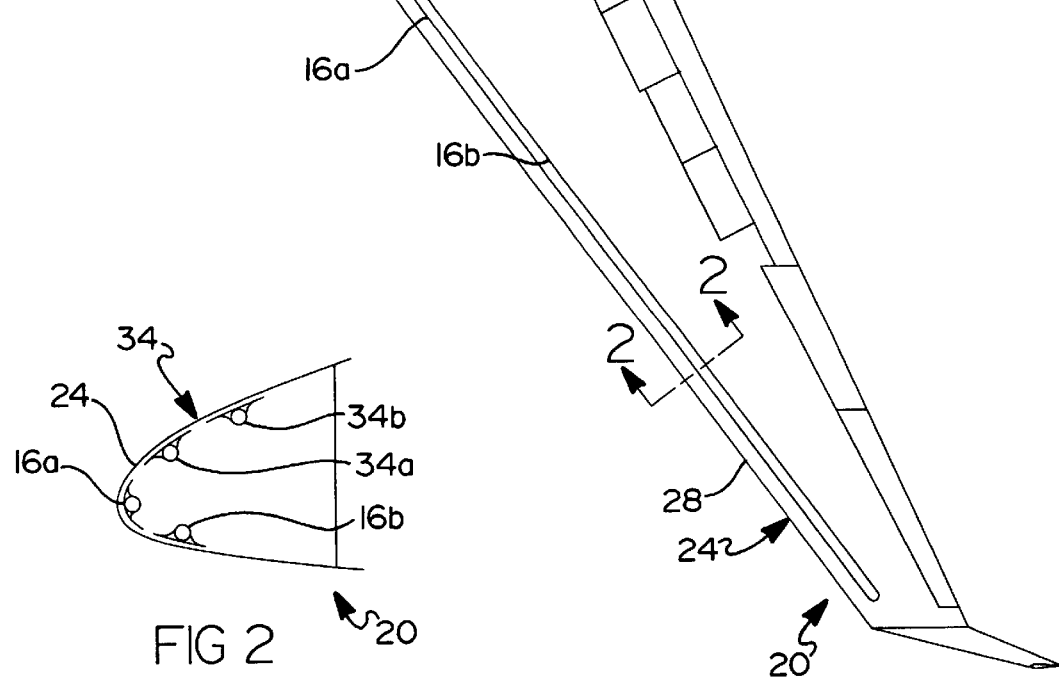
FIG. 2 is a highly simplified cross sectional view of a portion of the wing of FIG. 1 taken in accordance with section line 2.2 in FIG. 1.

With reference to FIG. 2, the orientation of the fluid supply portion 16a and fluid return portion 16b of conduit 16 are visible. As will be appreciated, one or more additional conduits 34 each having a fluid supply portion 34a and a fluid return portion 34b may be incorporated within the wing 20 and spaced to achieve an even distribution of heat over the wing surface. In this manner, the temperature of the wing can be better controlled to improve the laminar flow over the wing.

It will also be appreciated that if a plurality of independent conduits 16, 18, 30 and 34 are incorporated, the flow through some of these conduits can be restricted. In this manner, a relatively constant heat flux can be maintained in each flow circuit through the various engine power settings, flight conditions, and resulting heat load dissipation requirements. During periods of low heat generation and high anti-ice requirements, such as during aircraft descent, the heated fluid from the heat exchanger 14 is channeled only through those conduits 16 necessary for anti-ice requirements. During periods of high heat rejection, the fluid is channeled from the heat exchanger 14 through all conduits 16, 18 and 34.

The present invention thus provides a means of not only heating the wings of an aircraft to prevent icing thereof, but also provides better temperature control over the surface of each of the wings of an aircraft to increase the region of the laminar flow over the wings. By increasing the region of laminar flow and decreasing the region of turbulent flow over each of the wings, the drag associated with turbulent flow is reduced and fuel efficiency for the aircraft is increased.

It will be appreciated that while conduits have been described as the means for channeling the heated fluid, that any suitable component/structure could be used for this purpose. For example, it may be possible to achieve the desired heat transfer to the wings through the use of shells, integral panels or other means.

The present invention further utilizes heat generated by various components disposed within the fuselage of an aircraft, such as avionics equipment, to further help heat selected areas of the wings of the aircraft.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for heating an outer surface of a mobile platform, comprising:

a heat exchanger configured to be in thermal communication with a fluid used to cool an engine of said mobile platform;

a fluid disposed within said heat exchanger;

a first thermally conductive member configured to be disposed within a portion of said mobile platform in thermal contact with said outer surface of said mobile platform, said first thermally conductive member forming a portion of a circuit configured to use said fluid from said heat exchanger to heat a selected area of said mobile platform outer surface;

a second thermally conductive member coupled to said heat exchanger and extending into a fuselage of said mobile platform and configured to be in thermal communication with a power converter component disposed within said fuselage, said second thermally conductive member further configured to circulate said fluid from said heat exchanger to remove heat from said power converter component; and a pump configured to pump said fluid into contact with said first thermally conductive member, to thereby heat the selected area of said mobile platform outer surface.

2. The apparatus of claim 1, wherein said first thermally conductive member comprises a conduit configured to receive said fluid of said heat exchanger.

3. The apparatus of claim 2, wherein a plurality of first conduits are configured to be coupled to said heat exchanger and disposed within said mobile platform so as to be in thermal contact with said outer surface of said mobile platform.

4. The apparatus of claim 2, wherein said first conduit includes a supply portion and a return portion.

5. An apparatus for heating an outer surface of an aircraft to help prevent icing thereof, comprising:
    a heat exchanger configured to be in thermal communication with fluid used to cool a geared fan power plant of said aircraft;
    a fluid disposed within said heat exchanger;
    a first thermally conductive conduit configured to be disposed within a portion of said aircraft in thermal contact with said outer skin of said aircraft, said first conduit forming a circuit configured to allow said fluid to flow from said heat exchanger, through said first conduit and back to said heat exchanger;
    a second thermally conductive conduit coupled to said heat exchanger and extending into a fuselage of said aircraft and configured to be in thermal communication with a heat generating component disposed within said fuselage, said second conduit further configured to circulate said fluid from said heat exchanger to remove heat from said heat generating component, wherein said heat generating component comprises at least one of an avionics component and a power converter component of said aircraft;
    a pump configured to pump said fluid from said heat exchanger through said first conduit; and
    wherein said fluid through said first conduit operates to heat said outer skin to prevent ice buildup thereon.

6. The apparatus of claim 5, wherein said first conduit is configured to be disposed within a leading edge of a wing of said aircraft.

7. The apparatus of claim 5, further comprising a third thermally conductive conduit coupled to said heat exchanger and disposed adjacent said first conduit, configured for receiving said fluid and heating a selected area of said outer skin.

8. An apparatus for heating a leading edge of a wing of an aircraft to help prevent icing thereof, comprising:
    a heat exchanger in thermal communication with a fluid used to cool an engine of said aircraft;
    a fluid disposed within said heat exchanger;
    a first thermally conductive conduit disposed within a portion of said wing adjacent said leading edge in thermal contact with said outer skin of said wing, said first conduit forming a circuit by which said fluid may flow from said heat exchanger, through said first conduit and back to said heat exchanger;
    a second thermally conductive conduit coupled to said heat exchanger and extending into a fuselage of said aircraft and into thermal communication with a heat generating component disposed within said fuselage, said second conduit used to circulate said fluid from said heat exchanger to remove heat from said heat generating component, wherein said heat generating component comprises at least one of an avionics component and a power converter component of said aircraft;
    a pump for pumping said fluid from said heat exchanger through said first and back to said heat exchanger; and
    wherein said fluid through said first conduit operates to heat said outer skin of said leading edge of said wing to prevent ice buildup thereon.

9. The apparatus of claim 8, wherein said first conduit comprises an aluminum alloy conduit.

10. The apparatus of claim 8, further comprising a third thermally conductive conduit coupled to said heat exchanger and extending into said wing of said aircraft adjacent to said first conduit for circulating said fluid and heating a selected area of said wing.

11. A method for preventing icing of a wing of an aircraft, comprising:
    disposing a heat exchanger in thermal contact with a fluid used to cool an engine of said aircraft;
    disposing at least one thermally conductive first conduit within said wing so as to be in thermal contact with an outer skin of said wing adjacent a leading edge of said wing, and placing said first conduit in fluid communication with said heat exchanger;
    disposing at least one thermally conductive second conduit within a fuselage of said aircraft so as to be in thermal contact with a heat generating component disposed within said fuselage and said heat exchanger, wherein said heat generating component comprises at least one of an avionics component and a power converter component of said aircraft;
    circulating a fluid through said first and second conduits and said heat exchanger such that said fluid is heated by heat generated by said fluid used to cool said engine of said aircraft and said heat generating component within said fuselage; and
    using said heated fluid to heat said leading edge of said wing.

12. The method of claim 11, wherein the step of disposing said first conduit within said wing comprises disposing a continuous length of said first conduit forming a fluid supply portion and a fluid return portion within said wing.

13. The method of claim 11, further comprising the step of disposing a thermally conductive third conduit in said wing, wherein said thermally conductive third conduit is in fluid communication with said heat exchanger; and
    circulating said fluid through said thermally conductive third conduit to heat a selected area of said wing.

14. A method for enhancing laminar flow of air over a wing of an aircraft, comprising:
    disposing a heat exchanger in thermal contact with a fluid used to cool an engine of said aircraft;
    disposing at least one thermally conductive first conduit within said wing so as to be in thermal contact with an outer skin of said wing adjacent a leading edge of said wing, and placing said first conduit in fluid communication with said heat exchanger;
    disposing at least one thermally conductive second conduit within a fuselage of said aircraft so as to be in thermal contact with a heat generating component disposed within said fuselage and said heat exchanger, wherein said heat generating component comprises at least one of an avionics component and a power converter component of said aircraft;

circulating a fluid through said first and second conduits and said heat exchanger such that said fluid is heated by heat generated by said fluid used to cool said engine of said aircraft and said heat generating component within said fuselage; and using said heated fluid flowing within said first conduit to heat said outer skin of said wing, thereby increasing a region of laminar flow of air over said wing.

* * * * *